Sept. 20, 1949. E. S. COOK ET AL 2,482,246
LOAD COMPENSATING FLUID PRESSURE BRAKE APPARATUS
Filed March 20, 1947
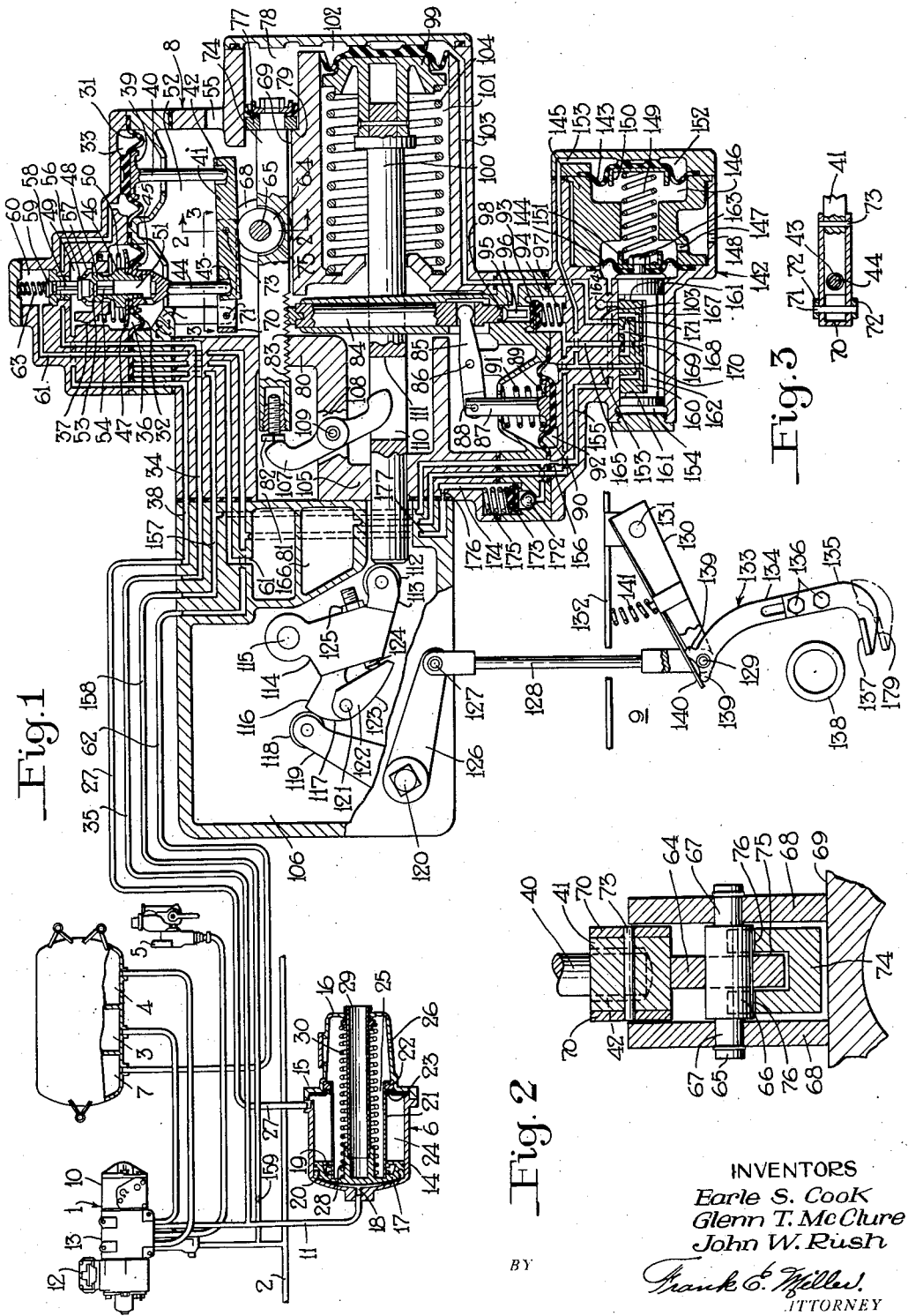
INVENTORS
Earle S. Cook
Glenn T. McClure
John W. Rush
BY Frank E. Miller
ATTORNEY Patented Sept. 20, 1949

2,482,246

UNITED STATES PATENT OFFICE 2,482,246

LOAD COMPENSATING FLUID PRESSURE BRAKE APPARATUS

Earle S. Cook, Forest Hills, Glenn T. McClure, McKeesport, and John W. Rush, Wilkinsburg, Pa., assignors to The Westinghouse Air Brake Company, Wilmerding, Pa., a corporation of Pennsylvania Application March 20, 1947, Serial No. 736,010

19 Claims. (Cl. 303—22)

1

This invention relates to variable load brake equipment and more particularly to the type adapted to be automatically adjusted to vary the degree of braking of a vehicle in accordance with the loaded condition thereof.

The present trend toward the use of light-weight materials in the construction of railway freight cars has resulted in much higher ratios of gross to tare weight than ever before encountered. A brake designed to provide desired deceleration and stopping of an empty car of this type is therefore wholly inadequate for the car when loaded, and conversely, a brake designed to provide desired deceleration and stopping of the loaded car could not be tolerated on the empty car since it might result in excessive and damaging train shock and cause undesired sliding of the car wheels.

The principal object of the invention is therefore the provision of an improved variable load brake equipment adapted to automatically vary the degree of braking of a car in accordance with the loaded condition thereof.

According to this object we employ a single brake cylinder device for braking the car, the piston therein having the usual pressure chamber at the front side thereof and a second pressure chamber at the opposite side. The well-known AB valve is used for varying the pressure of fluid in the usual pressure chamber at the front of the brake cylinder piston, and a novel relay valve device automatically adjustable according to the empty or loaded condition of the car, is arranged to operate upon supply of fluid under pressure to the usual pressure chamber to vary pressure of fluid in the second chamber, from atmospheric pressure for a fully loaded car, inversely in proportion to the degree of the load, for thereby varying the effect of the pressure of fluid on the front of the piston to apply the brake, as a result of which, the degree of braking of the car will be varied in proportion to the degree of load carried thereby. In other words, when the car is fully loaded the pressure in the second chamber will be atmospheric pressure so that the degree of brake application of the car will be governed solely by the pressure of fluid in the pressure chamber at the front of the brake cylinder piston, in the usual manner. When the car is less than fully loaded the degree of braking will be governed by the differential in pressures acting on opposite sides of the brake cylinder piston, and this differential will be of a minimum degree when the car is empty and will be increased in proportion to the degree of

2 load on the car until it disappears on the fully loaded car.

Other objects and advantages will become apparent from the following more detailed description of the invention.

In the accompanying drawing; Fig. 1 is a diagrammatic view, partly in outline and partly in section, of a variable load brake equipment embodying the invention; and Figs. 2 and 3 are, respectively, sectional views taken on lines 2—2 and 3—3 in Fig. 1.

Description

As shown in the drawing, the variable load brake equipment comprises a brake controlling valve device 1 to which is connected the usual brake pipe 2, auxiliary reservoir 3, emergency reservoir 4 and brake cylinder pressure retaining valve device 5, as well as a brake cylinder device 6. The equipment further comprises a load reservoir 7, a load compensating or variable leverage relay valve device 8 and a weighing gear or adjusting mechanism 9 associated with said compensating device. The auxiliary, emergency and load reservoirs are preferably provided in a common casing separated by dividing walls as shown in the drawing. All of the above enumerated structure is adapted to be carried by a sprung part of the car such as by the bottom of the floor thereof.

The brake controlling valve device 1 may be of substantially the same construction and have the same operating characteristics as the AB valve device fully described in the patent to Clyde C. Farmer, No. 2,031,213, issued Feb. 18, 1936, in view of which it is not deemed necessary to show and describe this device in detail. Briefly however, the brake controlling valve device 1 comprises a service portion 10 adapted to operate upon both a service and an emergency reduction in pressure of fluid in the brake pipe 2 for supplying fluid under pressure from the auxiliary reservoir 3 to a brake cylinder pipe 11 and thence to the brake cylinder device 6 for, upon a service reduction in brake pipe pressure, effecting a service application of brakes on the car. The brake controlling valve device 1 also comprises an emergency portion 12 which is adapted to operate only upon an emergency reduction of pressure of fluid in brake pipe 2 for supplying fluid under pressure from the emergency reservoir 4 to pipe 11 and thence to brake cylinder 6, wherein such pressure, in addition to that provided from the auxiliary reservoir 3 by operation of the service portion 10, is adapted to operate the brake cylinder device 6 for effecting an emergency application of brakes on the car. The service and emergency portions 10 and 12 of the brake controlling valve device 1 are mounted on opposite faces of a pipe bracket 13 to which all pipe connections to said valve device are made, as shown in the drawing.

The brake cylinder device 6 comprises a hollow-cup shaped casing 14 to the open end of which is secured an annular pressure head 15 from which projects a hollow-cup shaped non-pressure head 16. A brake cylinder piston 17 is slidably mounted in the casing 14 and at one side thereof is the usual or a main pressure chamber 18 to which is connected the pipe 11. The brake cylinder piston 7 comprises a piston head 19 to one face of which is connected a flexible packing cup 20 for preventing leakage of fluid under pressure from the pressure chamber 18 to the opposite side of the piston. Secured to and projecting from the piston 17 in a direction away from the pressure chamber 18 is a hollow stem 21 the opposite end of which is slidably mounted in a ring 22 secured in the pressure head 15. Carried by the pressure head 15 and ring 22 is a packing cup or ring 23 having sealing and sliding contact with the outer peripheral surface of the stem 21 for preventing leakage of fluid under pressure from a compensating pressure chamber 24 formed around said stem between the pressure head 15 and the piston 17, to a non-pressure chamber 25 formed within said stem and open to the interior of the non-pressure head 16 and thence to atmosphere through a port 26 in said non-pressure head. The chamber 24 is open to a pipe 27 through which fluid under pressure is adapted to be supplied to and released from said chamber by operation of the compensating valve device 8, in a manner which will be hereinafter described.

The piston head 19 is provided with a hollow boss 28 projecting into the hollow stem 21 in coaxial relation to said head and stem, and one end of a hollow rod 29 is secured in said boss. The rod 29 extends through the non-pressure chamber 25 and a bore provided in the outer end of the non-pressure head 16 to the exterior thereof, said rod being hollow to accommodate the usual push rod (not shown) for connecting the piston head 17 to the brake rigging (not shown) of the car, in the conventional manner. Encircling the hollow rod 29 is a brake cylinder piston release spring 30 one end of which bears against the piston head 19 for moving the brake cylinder piston 17 to its brake release position, in which it is shown in the drawing. The opposite end of the release spring 30 is supported on the non-pressure head 16.

The load compensating device 8 comprises pilot and balancing flexible diaphragms 31 and 32, respectively, preferably of the same area arranged edge to edge in spaced relation and with their axes parallel. At one side of diaphragm 31 is a pressure chamber 33 which is connected to the brake cylinder pipe 11 through a passage 34 and a pipe 35. At the same side of diaphragm 32 is a balancing chamber 36 which is connected to pipe 27, leading to pressure chamber 24 in the brake cylinder device, by way of a choke or restricted passage 37 and a passage 38. Engaging the opposite face of diaphragm 31 is a follower 39 provided on one end of a stem 40 the opposite end of which engages an equalizing member or beam 41 within a pocket 42. Engaging the opposite end of the beam 41 within a similar pocket 43 is one end of a stem 44. The opposite end of stem 44 is in the form of a follower 45 which is secured to the side of diaphragm 32 opposite chamber 36 by means of a nut 46 contained in said chamber and between which nut and diaphragm is interposed a spring seat 47.

The nut 46 has an extension 48 slidably mounted in a bore in the casing and separating chamber 36 from a chamber 49 which is in communication with the passage 38. A precompressed spring 50 contained in chamber 36 has one end supported by the casing while its opposite end bears against the spring seat 47. The nut 46 and extension 48 thereof are provided with an axial bore 51 open at one end to a chamber 52 in the casing and provided around the opposite end with a valve seat arranged for engagement by a release valve 53 which is contained in chamber 49 and which has a fluted stem 54 slidably mounted in said bore. Chamber 52 is in constant communication with atmosphere through a passage 55. It will be noted that the diaphragm stems 40, 44 and beam 41 are contained in chamber 52 and that the lower faces of the two diaphragms 31 and 32 are both subject to atmospheric pressure in said chamber.

The release valve 53, opposite the fluted stem 54, has an enlarged annular collar 56 one side of which is provided for contact with a combined valve guide and stop element 57 projecting from the casing into chamber 49, while the opposite side is arranged for contact by the end of a fluted stem 58 of a coaxially arranged fluid pressure supply valve 59 which is contained in a chamber 60. The chamber 60 is open to a passage 61 leading to a pipe 62 which is connected to the load reservoir 7. A bias spring 63 contained in chamber 60 bears on the supply valve 59 for urging it toward its seat.

The side of the equalizing member or beam 41 opposite that from which the diaphragm follower stems 40 and 44 project is supported on a fulcrum, preferably in the form of a roller 64, which is carried by an axle 65 on an enlarged central portion 66 thereof (Fig. 2). The axle 65 has reduced end portions 67 at opposite ends of the central portion 66 and mounted on these end portions are rollers 68, one disposed at either side of the beam 41 and arranged to roll on a flat surface 69 in the casing. The surface 69 is formed at right angles to the normal, parallel axes of the diaphragms 31 and 32.

The equalizing member or beam 41 is held against longitudinal movement by a yoke 70 pivoted at one end on a pin 71 carried in arms 72 projecting from the casing. The two arms of the yoke 70 are disposed at opposite sides of the beam 41 between the rollers 68, and their ends are pivotally connected to said beam near its center by a pin 73. The roller 64 is adapted to be adjusted relative to the beam 41 longitudinally thereof to provide at its line of contact with the beam a fulcrum therefor, the yoke 70 being effective during such adjustment, and at all other times, to prevent longitudinal movement of said beam but in no way interfering with rocking movement of the beam about its fulcrum connection with the roller 64, which will be later described.

Disposed between the equalizing member or beam 41 and the surface 69 and extending lengthwise of and substantially parallel to said surface is a piston rod 74. The rod 74 has a substantially semi-circular recess 75 of larger radius than roller 64 for receiving said roller, and at either side of said recess said rod is provided with a transverse slot 76 open to the top edge of said rod and in these slots the enlarged central portion 66 of axle 65, at either side of the roller 64, is slidably mounted, the rollers 68 being disposed at opposite sides of the piston rod 74.

Connected to one end of the piston rod 74 is a bias piston 77 open at one side to a control or pressure chamber 78, while the opposite side of said piston is open to the atmospheric chamber 52. A shoulder 79 in the casing is arranged for contact by piston 77 for limiting movement thereof in the direction of the left hand, movement in the direction of the right hand being limited by contact with the casing. The piston rod 74 projects from the piston 77 through the chamber 52 and a bore in a wall 80 separating said chamber from a chamber 81 in the casing, the end of said rod opposite said piston being supported by contact with the wall of said bore. An adjusting screw 82 is secured in the end of rod 74 disposed in chamber 81.

The fulcrum roller 64 has two extreme positions with respect to the equalizing member or beam 41, one position being that in which it is shown in the drawing and which is defined by contact between piston 77 and shoulder 79, and which position will hereinafter be referred to as the empty position which said roller will occupy when the car is empty. In the other extreme position to be hereinafter referred to as full-load position, the roller 64 will be substantially below the end of the diaphragm follower stem 40 and the piston 77 will be slightly spaced from contact with the end wall of chamber 78, and this position will be assumed when the car is fully loaded. For various degrees of car load between empty and full-load the roller 64 will assume a corresponding position between the empty and full-load positions, just mentioned. The automatic adjustment of fulcrum roller 64 to its different positions will be hereinafter described.

The piston rod 74 is provided with a plurality of teeth 83 along the side opposite the beam 41 for engagement by teeth on one end of a latch or locking plunger 84 which is mounted to slide in the casing in a direction at right angles to the length of said rod. A lever 85 fulcrumed on a pin 86 carried by a projection of the casing has one end connected to the plunger 84. The opposite end of lever 85 is connected to one end of a rod 87 by a pin 88, the opposite end of which rod is in the form of a follower 89 which engages one side of a latch or plunger control flexible diaphragm 90 which is clamped around its periphery in the casing. A spring 91 encircling the rod 87 and supported at one end on the casing bears against the diaphragm 90 for urging it and plunger 84 to the position in which they are shown in the drawing, in which position said plunger is in locking engagement with the piston rod 74. At the opposite side of diaphragm 91 is a pressure chamber 92 to which fluid under pressure is adapted to be supplied for deflecting said diaphragm against spring 91 for thereby actuating lever 85 to draw plunger 84 out of locking engagement with piston rod 74.

A check valve 93 contained in a chamber 94 is provided for closing communication between said chamber and a chamber 95 into which extends a projection 96 of the plunger 84. With plunger 84 in locking engagement with piston rod 74 the end of projection 96 is spaced from check valve 93 a distance slightly exceeding the extent of movement of said plunger required to release said plunger from said rod. Upon further movement, the projection 96 is adapted to engage and unseat valve 93. A spring 97 contained in chamber 94 acts on check valve 93 for urging it to its seat. A ring seal 98 on plunger 85 prevents leakage of fluid under pressure from chamber 95 to chamber 52.

Spaced from and extending generally parallel to the bias piston 77 and its rod 74 is an adjusting piston 99 and a rod 100 projecting from one side of said adjusting piston through a non-pressure chamber 101 which is open to chamber 52. At the opposite side of piston 99 is a pressure chamber 102 open to the bias piston pressure chamber 78 and to a passage 103 which passage also connects to chamber 95. A spring 104 contained in the non-pressure chamber 101 and encircling the rod 100 is supported at one end on the casing, while its opposite end bears against piston 99 for urging said piston and rod to the position in which they are shown in the drawing. The end of rod 100 opposite the piston 99 is supported in a bore in a wall 105 separating chamber 52 from a chamber 106.

A lever 107 extending through an opening 108 in a horizontal portion of the casing wall 80 is fulcrumed therein on a pin 109. The end of this lever in chamber 81 is arranged for contact with the end of the adjusting screw 82, while the opposite end of said lever is disposed in a slot 110 provided in the adjusting piston rod 100. The slot 110 is of such length as to permit the lever 107 to be free on pin 109 with the adjusting piston 99 in the normal position in which it is shown in the drawing, and to permit a chosen extent of movement of said piston against spring 104 before an end wall 111 of said slot engages said lever.

In chamber 106 the end of the adjusting piston rod 100 engages a roller 112 provided in the end of an arm 113 of a bell crank like lever 114 which at its knee is fulcrumed on a pin 115 secured in the casing. The lever 114 has another arm 116 on the end of which is provided a fixed cam surface 117 arranged for contact by a roller 118 provided in one end of a lever 119 the opposite end of which is secured to turn with a shaft 120 journaled in the casing. The cam surface 117 is of least radius at the end adjacent the roller 118, as viewed in the drawing. Pivoted by a pin 121 to the bell crank arm 116, adjacent the opposite end of cam surface 117, is an adjustable cam element 122 having a cam surface 123 constituting an extension of the fixed cam surface 117. The cam element 122 is supported on one end of an adjusting screw 124 carried by the lever arm 113. A lock nut 125 on screw 124 is provided for contact with the lever arm 113 for securing the screw in an adjusted position.

A lever 126 disposed outside of the casing has one end secured to turn with the shaft 120 while connected to its opposite end by a pin 127 is one end of a connecting rod 128. The other end of rod 128 is connected by a pin 129 to one end of an arm 130 the opposite end of which is mounted to turn on a pin 131 carried by a sprung part 132 of the car.

Also pivoted on the pin 129 is the upper end of a measuring arm 133 comprising over-lapping, upper and lower parts 134 and 135 rigidly clamped together by lock bolts 136. The lower end of the lower part 135 has an offset portion provided with a striking surface 137 for contacting the underside of an unsprung part 138 of the car truck in a substantially horizontal position of said surface. At each side of pin 129 the measuring arm 133 has an upstanding ear 139, the two ears being arranged for engagement by one end of a leaf tension spring 140 extending parallel to and over the top of the arm 130 and secured at its opposite end to said arm. A bias spring 141 is interposed under pressure between arm 130 and the sprung part 132 for normally biasing the arm 130, the bell crank like lever 114 and the connecting parts to the position in which they are shown in the drawing, under which condition the measuring arm 133 is biased by spring 140 to the position in which it also is shown in the drawing.

The specific structure just described including the bell crank like lever 114, the arm 130, the measuring arm 133, and the connecting parts, constituting the weighing gear or adjusting mechanism 9 of the brake equipment, is not a part of the present invention and will be covered by a separate application, but is shown herein for illustrating the present invention.

The load compensating device 8 further comprises a cut-off valve device 142. The cut-off valve device 142 comprises two coaxially arranged flexible diaphragms 143 and 144 clamped around their edges in the casing in spaced apart relation at opposite ends of an annular spacer element 145. Between the two diaphragms is a chamber 146 which is open to atmosphere through vent ports 147 and 148 and which contains a spring 149 the opposite ends of which bear against followers 150 and 151 engaging diaphragms 143 and 144, respectively, for urging said diaphragms apart. At the outer face of diaphragm 143, which is larger than diaphragm 144, is a pressure chamber 152 which is connected to a passage 153 also connected to the latch diaphragm chamber 92. At the opposite face of diaphragm 144 is a valve chamber 154 which is in constant communication with the brake pipe 2 through a passage 155, a choke 156, a passage 157 and thence by way of a pipe 158 in which there is provided a choke 159. In actual practice the pipe 158 is connected directly to pipe bracket 13 of the AB valve device 1 and through said pipe bracket to the well known brake pipe connection (not shown) therein, and the choke 159 is disposed in said bracket, but for the purpose of simplicity in the present application, the pipe 158 is shown in the drawing connected directly to the brake pipe 2, as above described.

The cut-off valve device 142 further comprises a slide valve 160 contained in chamber 154 and mounted therein between space shoulders 161 formed on a stem 162. One end of the stem 162 is connected by follower 151 and a cap screw 163 to the center of diaphragm 144 for rendering the slide valve 160 movable by and with said diaphragm.

Connected to the seat of the cut-off slide valve 160 is a passage 164 which leads to atmosphere, passage 163 from the bias and adjusting piston chambers 79 and 102, a passage 165 which leads to the check valve chamber 94 and to a timing reservoir 166, and passage 153 which leads to the latch diaphragm chamber 92 and to diaphragm chamber 152. The slide valve 160 is provided with ports 167, 168, 169 and 170 and a choke connection 171 between ports 167 and 168 for a purpose to be hereinafter described.

The load compensating device 8 further comprises two check valves 172 and 173 arranged in series in a connection between passage 157 and a passage 174, and a bias spring 175 acting on the check valve 173 for urging it to its seat. The passage 174 is connected through a choke 176 to a passage 177 which leads to passage 61 connected to the supply valve chamber 60 and to pipe 62 leading to the load reservoir 7.

Operation

In operation, let it be initially assumed that the brake equipment is void of fluid under pressure and that to condition the equipment for operation fluid under pressure is supplied to the brake pipe 2 in the usual manner.

The brake controlling valve device 1 will respond, in the usual manner, to the pressure of fluid thus supplied to the brake pipe 2 to charge the auxiliary reservoir 3 and the emergency reservoir 4 with fluid under pressure from said brake pipe, and to at the same time open to atmosphere, if not already open, the brake cylinder pipe 11 and thereby the pressure chamber 18 in the brake cylinder device 6. With pipe 11 thus open to atmosphere the pilot diaphragm chamber 33 in the load compensating device 8 will also be open to atmosphere by way of passage 34 and pipes 35 and 11, which will permit spring 50 to deflect the balancing diaphragm 32 against its stem 44 and rock beam 41 about its fulcrum connection with roller 64, regardless of the adjusted position of said roller, to deflect the pilot diaphragm 31 into contact with the casing, in which position these parts are shown on the drawing.

With the balancing diaphragm 32 positioned as just described, spring 63 will seat the fluid pressure supply valve 59 and the collar 56 on the release valve 53 will be just out of contact with the supply valve stem 58 and in engagement with the stop element 57 which will hold said release valve out of contact with its seat on the nut extension 48. With the release valve 53 thus open chambers 49 and 36, and thereby the connected compensating pressure chamber 24 in the brake cylinder device 6, will be open to atmosphere by way of chamber 52 and port 55. With both pressure chambers 18 and 24 in the brake cylinder device 6 thus open to atmosphere the brake cylinder piston 17 will assume its brake release position, in which it is shown in the drawing, under the action of the release spring 30.

When fluid under pressure is supplied to the brake pipe 2 for charging the equipment as above mentioned, fluid will also flow therefrom through choke 159 and pipe 158 to the load compensating device 8 and thence through passage 157, past the check valve 172 and 173, through choke 176, passages 177 and 61, and pipe 62 to the load reservoir 7 for charging said reservoir with fluid at the pressure carried in the brake pipe. At the same time fluid supplied from the brake pipe to the load compensating device 8 will flow from passage 157 through choke 156 and passage 155 into valve chamber 154 of the cut-off valve device 142.

The parts of the cut-off valve device 142 will occupy the cut-in position in which they are shown on the drawing until the pressure of fluid in the brake pipe 2 acting in valve chamber 154 is increased to a chosen degree, such as forty pounds, and during the time required to obtain this pressure, fluid from valve chamber 154 will flow through port 169 in the slide valve 160 to passage 165 and thence to the check valve chamber 94 and to the timing reservoir 166, and at the same time fluid will also flow from chamber 154 through port 170 in the slide valve to passage 153 and thence to the latch diaphragm chamber 92 and also to diaphragm chamber 152.

When the pressure of fluid thus supplied to the latch diaphragm chamber 92 is increased to a degree, such as ten pounds, sufficient to overcome the opposing force of spring 91, the diaphragm 90 will deflect against said spring and actuate lever 85 to draw the locking plunger 84 out of locking engagement with the bias piston rod 74, following which, the projection 97 of said plunger will engage and unseat check valve 93. Fluid under pressure supplied from the cut-off valve chamber 154 to the check valve chamber 94 will then flow to chamber 95 and thence through passage 103 to the adjusting piston chamber 102 and to the bias piston chamber 78. Fluid under pressure thus provided on the bias piston 77 will promptly move said piston to the position in which it is shown on the drawing, if it is not already in said position, for thereby actuating the axle 65 to move the fulcrum roller 64 to its empty position, in which it also is shown in the drawing.

When the pressure of fluid in chamber 102 acting on the adjusting piston 99 is increased to a degree sufficient to overcome the opposing force of spring 104 said piston will move against said spring and thereby rock the bell crank like lever 114 in a clockwise direction about pin 115 and through the medium of cam surface 117 the levers 119 and 126 will be rocked in a counter-clockwise direction and pull the connecting rod 128 in an upwardly direction. This movement of the connecting rod 128 will in turn rock the arm 130 about its fulcrum pin 131 and thus move the measuring arm 133 into contact with the unsprung part 138 of the truck. The measuring arm 133 as it is thus moved will first contact the side of the unsprung part 138 and will then be lifted vertically to bring the surface 137 thereof into engagement with the lowermost part of the unsprung part 138, this latter movement being relative to the arm 130 and being permitted by spring 140, and it will be noted that when surface 137 contacts the unsprung part 138 it will prevent further movement of piston 99.

When the equipment is initially installed on an empty car and is void of fluid under pressure, under which condition the parts thereof will occupy the positions in which they are shown on the drawing, the measuring arm 133 is moved manually against the side of the unsprung truck part 138 against the tension of spring 140 and by loosening and subsequently tightening the locking bolts 136, the surface 137 on the measuring arm 133 is spaced away from the lower most portion of the unsprung part 138 a certain chosen distance, so that when said surface engages the lower most part of the unsprung truck part 138, during initial charging of the equipment on an empty car, the end wall 111 of slot 110 in the adjusting piston rod 101 will just contact the adjacent end of lever 107 with said lever in the position in which it is shown on the drawing. By adjustment of the regulating screw 82 in the bias piston rod 74 the fulcrum roller 64 can then be accurately adjusted to its empty position, corresponding to the empty condition of the car. Furthermore with the car empty and the parts adjusted as just described roller 118 carried in the end of lever 119 will be just at the junction of the fixed cam surface 117 on the bell crank lever 114 and the cam surface 123 on the adjustable element 122.

Now assuming that the car is fully loaded the body thereof will occupy a position closer to the unsprung part 138 of the truck than when the car is empty. In this fully loaded position the surface 137 on the measuring element 133 may therefore initially occupy a position such as indicated by dot and dash line 179 in the drawing. In charging the equipment on a fully loaded car the adjusting piston 99 will therefore be moved by pressure of fluid in chamber 102 a greater distance to bring the surface 137 of the measuring arm 133 into contact with the underside of the unsprung part 138 than is required when the car is empty, and to effect this greater movement of surface 137 the cam surface 123 of the adjustable cam element 122 will become effective against the roller 119. When the adjusting piston 99 is thus operated to bring the measuring element 133 into contact with the underside of the unsprung truck part 138 on the loaded car, the end wall 111 of slot 110 will contact the end of lever 107 and then rock said lever in a clockwise direction and thereby actuate the bias piston rod 74 and the bias piston 77 against pressure of fluid in chamber 78 to a position in which the piston substantially contacts the end wall of chamber 78 and in which the roller 64 is in its full load position, substantially under the end of the diaphragm follower stem 40.

For various degrees of load on the car, between empty and full-load, the car body will assume corresponding positions with respect to the unsprung part 138 of the car, and as a result, the measuring arm 133, and the fulcrum roller 64 as actuated by the adjusting piston 99, will assume corresponding positions between the empty and full-load positions, as will be clear from the above description.

On different cars the deflection of the body supporting springs vary, as for example, on one car the deflection of the springs between the empty and full-loaded conditions of the car may be only three quarters of an inch, while on other cars it may be as great as two inches. The cam 122 is adjustable by screw 124 in accordance with the deflection characteristics of different car supporting springs to provide for greater or less movement of the measuring arm 133, as required to properly position the fulcrum roller 64 in accordance with the particular car to which the equipment is applied. For instance, assuming that cam element 122, as shown in the drawing is adjusted for a car spring deflection of three quarters of an inch, and that the equipment is applied to a car on which the deflection of the body supporting springs is two inches, the cam element 122 will be adjusted outwardly in a clockwise direction to a position for increasing the movement of the measuring arm 133 with respect to the movement of the adjusting piston 99 to a degree which will provide the same positioning of the fulcrum roller 64 with respect to the fulcrum beam 41 for the fully loaded car as would be obtained on a car having a less spring deflection. It will thus be seen that regardless of the different deflection characteristics of the body supporting springs on different cars to which the equipment is applied, the adjustment of the cam element 122 provides for obtaining the same positioning of roller 64 with respect to the fulcrum beam 41 for different degrees of load on the different cars.

While the fulcrum roller 64 of the load compensating device 8 is being adjusted to a position corresponding to the empty or loaded condition of the car as just described, the pressure of fluid in diaphragm chamber 152 of the cut-out valve device 142 will continue to increase with the increase in pressure in the cut-off valve chamber 154 and in the brake pipe 2. This increase in pressure in diaphragm chamber 152 will act to correspondingly increase the pressure of spring 149 against diaphragm 144 to offset the increase in pressure of fluid in valve chamber 154 on said diaphragm so as to hold the diaphragm 144 and slide valve 160 against movement out of the cut-in position, in which they are shown on the drawing, for a certain period of time. Eventually the pressure of fluid in diaphragm chamber 152 will become increased to a degree at which deflection of diaphragm 143 will be stopped by contact of the diaphragm follower 150 with the spacer element 145 thereby limiting to a certain selected degree this increase in pressure of spring 149 against diaphragm 144. Then when the pressure of fluid in brake pipe 2 and in valve chamber 154 is increased to a degree, such as 40 pounds, which is sufficient to overcome the opposing increased pressure of spring 149 the diaphragm 144 will be deflected toward the right hand to a position defined by contact between the follower 151 and the spacer element 145 for thereby shifting the slide valve 160 to a cut-off position.

In the cut-off position of the cut-off slide valve 160 the port 167 therein connects passage 153 to the atmospheric passage 164 whereupon the fluid under pressure is promptly vented from the latch diaphragm chamber 92 and from diaphragm chamber 152. The venting of fluid under pressure from the latter chamber permits the diaphragm 143 to be returned to the position in which it is shown in the drawing by spring 149, which reduces the force of said spring on the diaphragm 144 to a degree which will prevent return of the latter diaphragm and of the slide valve 160 to their cut-in position, shown in the drawing, until the brake pipe pressure effective in valve chamber 154 is reduced to a relatively low degree, such as 8 pounds, thereby insuring that the cut-out slide valve 160 will remain in its cut-off position, so as to maintain the fulcrum roller 64 in its adjusted position, during all operation of the brakes on the car while connected in a train.

The venting of fluid under pressure from the latch diaphragm chamber 92 permits spring 91 to return diaphragm 90 and lever 85 to the position in which they are shown on the drawing. This operation of lever 85 actuates plunger 84 out of engagement with the check valve 93 and into locking engagement with the bias piston rod 74. The check valve 93 will then be seated by spring 97.

At the same time as the fluid under pressure is released from the latch diaphragm chamber 92 and from diaphragm chamber 152, port 168 in the cut-off slide valve 160 connects passages 165 and 163 to the atmospheric passage 164 by way of the choke connection 171. The timing reservoir 166, previously charged with fluid under pressure from the brake pipe, is thus placed in communication with the adjusting piston chamber 102 and bias piston chamber 78, and said reservoir and these chambers are all opened to atmosphere through the restricted connection 171, whereby the pressure of fluid in said reservoir and chambers will be gradually reduced at a rate determined by the flow capacity of said connection.

The volume of the timing reservoir 166 with respect to the flow capacity of the choke connection 171 is such as to maintain sufficient pressure on the bias piston 77 and adjusting piston 99 to hold the bias piston rod 74 against lever 107 and to hold the measuring arm 133 in contact with the unsprung part 138 of the truck until after plunger 85 is moved into locking engagement with the bias piston rod 74, following which, the pressure of fluid in said reservoir and chambers will continue to reduce to atmospheric pressure. When the pressure of fluid in the adjusting piston chamber 102 is thus sufficiently reduced, spring 104 will return the adjusting piston 99 to the position in which it is shown in the drawing; but the bias piston 77, and thereby the fulcrum roller 64, will be maintained in the position to which they were adjusted by the locking action of plunger 84.

When the adjusting piston 99 is returned to the position in which it is shown on the drawing, bias spring 141 acting on the arm 130 will urge said arm downwardly for moving the measuring arm 133 out of contact with the unsprung part 138 of the truck and back to the position in which it is shown on the drawing; and during such movement the connecting rod 128 and thereby levers 126 and 119 will also be actuated by said spring to return the bell crank like lever 114 to the position in which it also is shown on the drawing. With the measuring element 133 moved downwardly and to one side of the unsprung part 138 of the truck, contact therebetween is positively avoided during operation of the car in the train around curves, over humps, etc., to prevent damage to these parts.

After the cut-out valve devices 142 operates to cause locking of the fulcrum roller 64 in its adjusted position and disengagement of the measuring arm 133 from the unsprung truck part 138, as just described, the brake pipe 2 will continue to be increased up to the normal pressure carried and the load reservoir 7 will become charged by way of the check valves 172 and 173 to substantially the same degree of pressure, as will be apparent.

In the operation above described, the load reservoir charging choke 176 restricts flow of fluid under pressure to the load reservoir 7 so as to cause more prompt operation of the load compensating device 8 to adjust the position of the fulcrum roller 64, and therefore, more prompt conditioning of the car for operation in a train, than could otherwise be obtained. The chokes 159 and 160, acting in series, limits the rate of supply of fluid under pressure to the cut-off valve chamber 154 from the brake pipe 2, and the timing reservoir 166 being connected to valve chamber 154 in the cut-in position of the cut-off valve device 142 acts in conjunction with the flow capacity of said chokes to insure that the cut-out valve device 142 will not move out of its cut-in position, in which it is shown in the drawing, to its cut-off position for a definite period of time, even if the brakepipe 2 on the car is connected to a fully charged brake pipe of a train, as might occur in service, this period of time being adequate to insure proper adjustment of the fulcrum roller 64, as above described. The choke 159 is also effective, in case the pipe 158 between said choke and the load compensating device 8 becomes broken to so restrict venting of fluid under pressure from the brake pipe 2 as to prevent an emergency rate of reduction in pressure in the brake pipe 2 and the connected brake pipe of a train, for thereby preventing an undesired emergency application of brakes on the train under such a condition. The choke 159 also acts in a similar manner, upon connecting the brake pipe 2, when void of fluid under pressure, to the fully charged brake pipe of a train, to prevent an emergency application of brakes on said train.

With the equipment conditioned for operation, and with the brake pipe 2 fully charged to normal pressure, if either a service or an emergency reduction in pressure in said brake pipe is effected, the brake controlling valve device 1 will operate to supply fluid under pressure from either the auxiliary reservoir 3, or from both the auxiliary reservoir 3 and emergency reservoir 4, respectively, to the brake cylinder pipe 11 and thence to the main pressure chamber 18 in the brake cylinder device 6, in the usual well-known manner. Fluid at the pressure thus provided in the brake cylinder pipe 11 will flow through pipe 35 and passage 34 to the pilot diaphragm chamber 33 in the load compensating device 8.

Let it be assumed that the fulcrum roller 64 is in the empty position in which it is shown on the drawing. The pressure of fluid in the pilot diaphragm chamber 33 will then deflect the diaphragm 31 downward and rock the beam 41 about the fulcrum connection with roller 64 and thereby act through stem 44 to move the diaphragm 32 and nut 46 in an upward direction into contact with the release valve 53 and then actuate said valve to open the supply valve 59. Upon opening the supply valve 59 fluid under pressure from the load reservoir 7 will flow through pipe 62, passage 61 and the supply valve chamber 60 to chamber 49 and thence through passage 38 to the compensating pressure chamber 24 in the brake cylinder device 6, and at the same time fluid under pressure will flow from passage 38 through choke 37 to chamber 36 at the upper side of diaphragm 32. Choke 37 is merely a stabilizing choke and its purpose is to prevent the pressure in diaphragm chamber 36 increasing ahead of that in the pressure chamber 24 of the brake cylinder device 6.

Fluid under pressure will thus continue to be supplied to the compensating pressure chamber 24 in the brake cylinder device and to diaphragm chamber 36 until such pressure acting on diaphragm 32, plus the pressure of spring 50, acting on one end of the beam 41 is increased to a degree sufficient to over-balance the pilot pressure in chamber 33 acting on diaphragm 31, whereupon diaphragm 32 will be deflected downwardly to permit closing of the supply valve 59 by spring 63 for preventing further flow of fluid under pressure to the compensating pressure chamber 24 in the brake cylinder device 6. When the supply valve 59 is closed, as just mentioned, there will be no further flow of fluid under pressure to and consequent increase in pressure of fluid in diaphragm chamber 36 whereupon deflection of diaphragm 32 will cease in a lap position in which the fluid pressure release valve 53 is still seated. With the fulcrum roller 64 in the empty position, substantially midway between the diaphragm stems 40 and 44, the pressure of fluid obtained in the compensating pressure chamber 24 of the brake cylinder device 6 will therefore be limited to a degree slightly less than the pressure of fluid in the main brake cylinder pressure chamber 18 as determined mainly by the pressure of spring 50 on diaphragm 32.

The pressure of fluid thus provided in the compensating pressure chamber 24 of the brake cylinder device 6 acts over the area of the brake cylinder piston 17 outside of the hollow stem 21, and the force thus created is less than that due to pressure of fluid in the main pressure chamber 18 acting over the full area of said piston, so that said piston will be forced in the direction of the right hand against the release spring 30 to apply the brakes with a pressure equal to the differential between these forces, this latter pressure being adequate to insure desired braking of the empty car.

If the fulcrum roller 64 is in its full-load position, substantially under the end of the diaphragm stem 41, the pressure of spring 50 on diaphragm 32 will hold said diaphragm and thereby the diaphragm 31 in the position in which they are shown in the drawing against the maximum pressure of fluid which will be provided in the brake cylinder pressure chamber 18 and thereby in the pilot diaphragm chamber 33 in effecting an application of brakes on the car. As a result, the release valve 53 will be maintained open by spring 50 so as to maintain the compensating pressure chamber 24 in the brake cylinder device 6 open to atmosphere, as a result of which, the braking force obtained on the fully loaded car will be governed by the pressure of fluid provided in chamber 18 acting over and times the full area of piston 17.

Now assume that the fulcrum roller 64 is adjusted midway between its empty and full-load positions, for example for a car half loaded, fluid will be provided in the compensating pressure chamber 24 in the brake cylinder device 6, and thereby in diaphragm chamber 36 in the compensating device, until the pressure thereof plus that of spring 50 is able to over-balance the pressure in the pilot diaphragm chamber 33 so as to permit closing of the supply valve 59, whereby the brakes on the car will be applied by force, governed by the pressure of fluid in chamber 18 acting on the full area of piston 17 less the opposing pressure of fluid in the compensating pressure chamber 24 acting on a smaller area of said piston, which opposing pressure is proportional to the semi-loaded condition of the car, whereby the braking power delivered by the brake cylinder device 6 for braking the car will be proportional to the semi-loaded condition thereof. It will be apparent that for any other adjustment of the fulcrum roller 64 between its empty and full-load positions the pressure of fluid in the compensating pressure chamber 24 of the brake cylinder device 6 will be correspondingly limited so as to provide a braking force for the car proportional to the degree of load on the car.

In case an emergency reduction in pressure in the brake pipe 2 is effected for effecting an emergency application of brakes, the pressure in said brake pipe and thereby in the cut-off valve chamber 154 will be reduced to atmospheric pressure, and when the pressure fluid in said chamber becomes reduced to a degree below the opposing force of spring 149, said spring will actuate diaphragm 144 and the slide valve 160 back to their cut-in position, in which they are shown on the drawing. When the slide valve 160 is returned to its cut-in position the latch diaphragm chamber 92 will be open to the valve chamber 154 and thereby to the brake pipe 2. The pressure of fluid against which spring 149 can thus return the cut-off slide valve 160 to its cut-in position is however lower (for instance eight pounds) than that required in the latch diaphragm chamber 92 for actuating the diaphragm 90 to move plunger 84 out of locking engagement with the bias piston rod 74, so that the position of the fulcrum roller 64 will not change under such a condition.

In applying the car brakes, as above described, it is desired to again point out that on a fully loaded car the spring 50 acts to hold the release valve 53 open to permit the pressure of fluid in the pressure chamber 24 of the brake cylinder device 6 to remain at atmospheric pressure. When the car is less than fully loaded, however, the spring 50 acts to delay opening of the supply valve 59 by fluid under pressure acting on the pilot diaphragm 31, and thus acts to correspondingly delay establishment of pressure of fluid in the compensating pressure chamber 24 of the brake cylinder device 6 until after a sufficient pressure of fluid is obtained in the main pressure chamber 18 to actuate the brake cylinder piston 17 to positively and promptly move the brake shoes on the car into contact with the car wheels, following which, pressure of fluid in said compensating chamber will increase substantially in unison with that in the main pressure chamber 18 for limiting the degree of braking on the car in accordance with the load carried thereby.

Upon an increase in pressure of fluid in brake pipe 2 for causing operation of the brake controlling valve device 1 to effect a release of fluid under pressure from the brake cylinder pipe 11 and thereby from the main pressure chamber 18 in the brake cylinder device 6 for releasing the brakes on the car, a corresponding reduction in pressure of fluid in the pilot diaphragm chamber 33 will occur. As the pressure of fluid in chamber 33 is thus reduced, the pressure of fluid in chamber 36, plus the pressure of spring 50, will deflect the diaphragm 32 and thereby rock the beam 41 about its fulcrum connection with the roller 64 for pulling the nut extension 48 out of engagement with the release valve 53. Upon opening of the release valve 53 fluid under pressure will be released from the compensating pressure chamber 24 in the brake cylinder device along with the release of fluid under pressure from the main pressure chamber 18. When the pressure of fluid in pressure chamber 18 of the brake cylinder device 6 is thus reduced sufficiently the brake cylinder release spring 30 will return piston 17 to its release position shown in the drawing, whereby the brakes on the car will be released.

It will of course be evident that when the roller 64 is in full-load position and no fluid pressure is provided in the brake cylinder compensating pressure chamber 24 in effecting an application of brakes, there will be no release of fluid therefrom in effecting a release of brakes, but there will be flow of fluid past the open release valve 53 into said chamber as the brake cylinder piston 17 is returned to its brake release position, it being noted that the open release valve 53 on a fully loaded car provides in effect a breather connection between the brake cylinder compensating pressure chamber 24 and atmosphere.

When the brakes of the car are released the spring 50 acting on diaphragm 32 insures that the release valve 53 will remain open to dissipate to atmosphere any leakage of fluid which may occur past the supply valve 59, to thereby insure against such pressure becoming effective in the compensating pressure chamber 24 of the brake cylinder device when not desired and which might interfere with a subsequent application of brakes. Moreover, with the brakes released the spring 50 positively maintains the beam 41 in contact with the roller 64 and the pilot diaphragm 31 in contact with the casing as shown on the drawing to avoid rattle and needless wear of these and the inter-connecting parts.

When the car is set out on a siding for loading, or for unloading and reloading, the brake pipe 2 will be open to atmosphere and the brake cylinder device 6 will be operated to apply the brakes on the car in the same manner as above described and to a degree corresponding to the empty or loaded condition thereof. When the car is again picked up and placed in a train the compensating valve device 8 will again operate in response to charging of the brake pipe 2 to adjust, or readjust if necessary, the position of the fulcrum roller 64 in accordance with the empty or loaded condition of the car in the same manner as herein before described, whereby during operation of the car in the train the degree of braking of the car will again be limited in accordance with the empty or loaded condition thereof.

*Summary*

It will now be seen that we have provided a relatively simple variable load brake equipment for freight cars which is automatic and positive in operation to vary the degree of braking of the car in accordance with the empty or loaded condition thereof. The equipment constitutes, mainly the substitution, for the usual single pressure type of brake cylinder device now employed on cars, of a compensating brake cylinder device providing a second controlling fluid pressure which is varied in inverse proportion to the degree of load carried by the car to thereby limit the braking of the car in substantial proportion to the degree of said load; and the addition of a load compensating device which is automatically adjustable in accordance with the empty or loaded condition of the car for automatically regulating this second control pressure in the brake cylinder device.

Having now described the invention, what we claim as new and desire to secure by Letters Patent, is:

1. In a vehicle variable load brake equipment, in combination, a brake pipe, brake controlling means operative upon a reduction in pressure of fluid in said brake pipe to effect an application of brakes on said vehicle, adjustable mechanism for limiting the degree of said application in accordance with the degree of load carried by said vehicle, motor means operable by fluid under pressure for adjusting said mechanism, latch means for holding said mechanism in an adjusted condition and adapted to be rendered ineffective upon supply of fluid under pressure to a control chamber, a slide valve disposed in a valve chamber open to said brake pipe and having a cut-in position and a cut-off position, a passage connecting said control chamber to the seat of said slide-valve, second and third passages connecting said motor means to said seat, said slide valve in said cut-in position opening the first named passage and said second passage directly to said valve chamber and lapping said third passage, and in said cut-off position opening said first and third passages to atmosphere, choke means for restricting flow of fluid under pressure from said third passage, a check valve in said second passage for preventing flow of fluid under pressure therethrough in the direction to said motor means, means operative by said latch means, subsequent to being rendered ineffective, to open said check valve, and means controlled by pressure of fluid in said brake pipe operative upon an increase in pressure therein to a chosen degree to move said slide valve to said cut-off position and upon a reduction in brake pipe pressure to a chosen lower degree to move said slide valve to said cut-in position.

2. In a vehicle variable load brake equipment, in combination, a brake pipe, brake controlling means operative upon a reduction in pressure in said brake pipe to effect an application of brakes on said vehicle, adjustable mechanism for limiting the degree of said application in accordance with the degree of load carried by said vehicle, motor means operable by fluid under pressure for adjusting said mechanism, latch means for holding said mechanism in an adjusted condition and adapted to be rendered ineffective upon supply of fluid under pressure to a control chamber, a slide valve disposed in a valve chamber open to said brake pipe and having a cut-in position and a cut-off position, a passage connecting said control chamber to the seat of said slide valve, second and third passages connecting said motor means to said seat, a timing reservoir open at all times to said second passage, said slide valve in said cut-in position opening the first named passage and said second passage directly to said valve chamber and lapping said third passage and in said cut-off position opening said first and third passages to atmosphere, choke means for restricting flow of fluid under pressure from said third passage, a check valve in said second passage for preventing flow of fluid under pressure therethrough in the direction to said motor means, means operative by said latch means subsequent to being rendered ineffective to open said check valve, choke means for restricting flow of fluid under pressure from said brake pipe to said valve chamber, and means controlled by pressure of fluid in said brake pipe operative upon an increase in pressure therein to a chosen degree to move said slide valve to said cut-off position and upon a reduction in brake pipe pressure to a chosen lower degree to move said slide valve to said cut-in position.

3. In a vehicle variable load brake equipment, in combination, a brake pipe, brake controlling means operative upon a reduction in pressure in said brake pipe to effect an application of brakes on said vehicle, adjustable mechanism for limiting the degree of said application in accordance with the degree of load carried by said vehicle, motor means operable by fluid under pressure for adjusting said mechanism, latch means for holding said mechanism in an adjusted condition and adapted to be rendered ineffective upon supply of fluid under pressure to a control chamber, a cut-off valve having a cut-in position for establishing communication between said brake pipe, and said motor means and control chamber for supplying fluid under pressure thereto, and having a cut-off position for releasing fluid under pressure from said control chamber and motor means, means for delaying release of fluid under pressure from said motor means with respect to release of fluid under pressure from said control chamber, a spring, a movable abutment connected to said cut-off valve subject to opposing pressures of said spring and of fluid in said brake pipe, said abutment being operative upon an increase in brake pipe pressure to a degree to overcome said spring to move said cut-off valve to said cut-off position and upon a reduction in brake pipe pressure to a degree below the pressure of said spring to move said cut-out valve to said cut-in position, another movable abutment of greater area than the first named abutment and subject to pressure of fluid in another chamber and opposing pressure of said spring means and operative upon supply of fluid under pressure to said other chamber to increase the pressure of said spring means against the first named abutment and upon release of fluid under pressure from said other chamber to reduce the pressure of said spring means on said first named abutment, and a passage providing a constantly open communication between said other chamber and said control chamber.

4. In a vehicle variable load brake equipment, in combination, a brake pipe, brake controlling means operative upon a reduction in pressure of fluid in said brake pipe to effect an application of brakes on said vehicle, adjustable mechanism for limiting the degree of said application in accordance with the degree of load carried by said vehicle, motor means operable by fluid under pressure for adjusting said mechanism, latch pressure means for holding said mechanism in an adjusted condition and adapted to be rendered ineffective by fluid under pressure, a cut-off slide valve disposed in a chamber and having a cut-in position and a cut-off position, means opening said chamber to said brake pipe, a timing reservoir, a check valve chamber, a check valve in said check valve chamber for closing a communication therebetween and said motor means, a passage permanently connecting said chambers to each other and to the seat of said slide valve, said slide valve comprising means effective in the cut-in position thereof to open said passage to said valve chamber and to also establish communication between said valve chamber and latch means for supplying fluid under pressure thereto, and further comprising means effective in said cut-off position for opening said passage directly to said motor means and to atmosphere and for also opening said latch means to atmosphere, choke means in the atmospheric connection to said passage, means operative by said latch means, subsequent to becoming ineffective, to open said check valve, and means operative upon an increase in pressure in said brake pipe to a chosen degree to move said cut-off slide valve to said cut-off position and upon a reduction in brake pipe pressure to a chosen lower degree to move said cut-off slide valve to said cut-in position.

5. In a vehicle variable load brake equipment, in combination, a brake pipe, brake controlling means operative upon a reduction in pressure of fluid in said brake pipe to effect an application of brakes on said vehicle, adjustable mechanism for limiting the degree of said application in accordance with the degree of load carried by said vehicle, motor means operable upon supply of fluid under pressure to a chamber for adjusting said mechanism, latch means for latching said mechanism in an adjusted position and operable upon supply of fluid under pressure to a control chamber to release said mechanism for adjustment by said motor means, a timing reservoir, a check valve chamber, a passage connecting said reservoir and check valve chamber, a check valve in said check valve chamber for preventing flow of fluid under pressure through a communication from said passage to said motor means, means operable by said latch means, subsequent to releasing said mechanism, to open said check valve, a cut-off slide valve contained in a slide valve chamber and having a cut-in position and a cut-off position, means opening said slide valve chamber to said brake pipe, said slide valve comprising means effective in the cut-in position thereof to open said passage and control chamber to said slide valve chamber and in said cut-off position to open said control chamber to atmosphere and to also open said passage directly to said motor means and also to atmosphere, choke means in the atmospheric connection of said passage for delaying reduction in pressure of fluid in said motor means with respect to reduction in pressure of fluid in said control chamber, a spring, a movable abutment connected to said slide valve subject to opposing pressure of said spring and of fluid in said valve chamber and operable to move said slide valve to said cut-off position upon an increase in brake pipe pressure in said slide valve chamber sufficient to overcome said spring, said spring being operative to move said slide valve to said cut-in position upon a reduction in pressure of fluid in said slide valve chamber to a chosen lower degree, a second movable abutment of larger area than the first named abutment operable upon supply of fluid under pressure to a chamber to increase the pressure of said spring on the first named movable abutment and operable upon venting of fluid under pressure from the last named chamber to reduce the pressure of said spring on said first named movable abutment, and the passage connecting the last named chamber and said control chamber.

6. In a vehicle variable load brake equipment, in combination, a brake pipe, brake controlling means including a compensating device operable upon a reduction in brake pipe pressure to effect an application of brakes on a vehicle to a degree corresponding to the loaded condition thereof, said compensating device comprising an equalizing beam, an adjustable fulcrum for said beam having a full-load position and an empty position spaced from said full load position, a bias piston operable upon supply of fluid under pressure to a bias piston chamber to move said fulcrum to its empty position, an adjusting piston of greater area than said bias piston movable upon supply of fluid under pressure to an adjusting piston chamber, means for limiting the extent of movement of said adjusting piston by fluid under pressure to a position corresponding with the degree of load on the vehicle, means operable by said adjusting piston upon movement thereof by fluid under pressure to move said fulcrum against pressure of fluid on said bias piston in the direction of said full load position to a position corresponding to that of said adjusting piston, means for supplying fluid under pressure to and for releasing fluid under pressure from said bias and adjusting pistons in unison, and means for holding said fulcrum in an adjusted position upon release of fluid under pressure from said pistons.

7. In a vehicle variable load brake equipment, in combination, a brake pipe, brake controlling means including a compensating device operable upon a reduction in brake pipe pressure to effect an application of brakes on a vehicle to a degree corresponding to the loaded condition thereof, said compensating device comprising an equalizing beam, an adjustable fulcrum for said beam having a full-load position and an empty position spaced from said full load position, a bias piston operable upon supply of fluid under pressure to a bias piston chamber to move said fulcrum to its empty position, an adjusting piston of greater area than said bias piston movable upon supply of fluid under pressure to an adjusting piston chamber, means for limiting the extent of movement of said adjusting piston by fluid under pressure to a position corresponding with the degree of load on the vehicle, means operable by said adjusting piston upon movement thereof by fluid under pressure to move said fulcrum against pressure of fluid on said bias piston to a position corresponding to that of said adjusting piston, an adjustable connection between said adjusting piston and fulcrum for adjusting said fulcrum to said empty position with said adjusting piston in a position corresponding to no load on said vehicle, means for supplying fluid under pressure to and for releasing fluid under pressure from said bias and adjusting piston in unison, and means for holding said fulcrum in an adjusted position upon release of fluid under pressure from said pistons.

8. In a vehicle variable load brake equipment, in combination, a brake pipe, brake controlling means including a compensating device operable upon a reduction in brake pipe pressure to effect an application of brakes on a vehicle to a degree corresponding to the load condition thereof, said compensating device comprising an equalizing beam, an adjustable fulcrum for said beam having a full-load position and an empty position spaced from said full load position, a bias piston operable upon supply of fluid under pressure to a bias piston chamber to move said fulcrum to its empty position, an adjusting piston of greater area than said bias piston movable upon supply of fluid under pressure to an adjusting piston chamber, means for limiting the extent of movement of said adjusting piston by fluid under pressure to a position corresponding with the degree of load on the vehicle, means operable by said adjusting piston upon movement thereof by fluid under pressure to move said fulcrum against pressure of fluid on said bias piston to a position corresponding to that of said adjusting piston, latch means for locking said fulcrum in an adjusted position and adapted to be rendered ineffective by fluid under pressure, means for supplying fluid under pressure to said latch means, means operable by said latch means, upon being rendered ineffective, to supply fluid under pressure to said bias and adjusting pistons, means for releasing fluid under pressure from said latch means and from said bias and adjusting pistons, and means for restricting release of fluid under pressure from said adjusting piston with respect to the release of fluid under pressure from said latch means.

9. In a vehicle variable load brake equipment, in combination, a brake pipe, brake controlling means operative upon a reduction in pressure of fluid in said brake pipe to effect an application of brakes on said vehicle, an adjustable mechanism for limiting the degree of said application in accordance with the degree of load carried by said vehicle, motor means operable by fluid under pressure for adjusting said mechanism, latch means for holding said mechanism in an adjusted position, spring means for actuating said latch means, a movable abutment subject to opposing pressures of said spring means and of fluid in a control chamber and operative upon an increase in pressure of such fluid to overcome said spring means to render said latch means ineffective, cut-off valve means having a cut-in position for establishing communication between said brake pipe and said motor means and control chamber and having a cut-off position for releasing fluid under pressure from said motor means and control chamber, said cut-off means comprising a movable abutment subject on one side to pressure of fluid in said brake pipe, and a control spring, opposing pressure of fluid on said movable abutment of said cut-out means with a force less than the force of said spring means on said movable abutment of said latch means, said cut-off means being operative to said cut-off position upon an increase in brake pipe pressure sufficient to overcome said control spring and to said cut-in position upon a reduction in brake pipe pressure to a degree to render said control spring preponderant over brake pipe pressure.

10. In a variable load brake squipment for a vehicle having a sprung part and an unsprung part, a brake pipe, a brake cylinder device comprising a casing and a piston therein dividing said casing into a main pressure chamber at one side of said piston from a compensating chamber at the opposite side and operative to provide a braking force on said vehicle equal to the difference in effect of fluid pressure in said chambers on said piston, brake controlling means operative upon a reduction in brake pipe pressure to supply fluid under pressure to said main chamber and upon an increase in pressure in said brake pipe to release fluid under pressure from said main chamber, a compensating device comprising an adjustable fulcrum and an equalizing beam supported and operative on said fulcrum and subject opposingly to pressures of fluid in said chambers for varying the pressure of fluid in said compensating chamber in accordance with the adjustment of said fulcrum and the pressure of fluid in same main chamber, and adjusting means operable in accordance with the position of said sprung part with respect to said unsprung part to correspondingly adjust said fulcrum relative to said lever.

11. In a variable load brake equipment for a vehicle having a sprung part and an unsprung part, a brake pipe, a brake cylinder device comprising a casing and a piston therein dividing said casing into a main pressure chamber at one side of said piston and a compensating chamber at the opposite side and operative to provide braking force on said vehicle equal to the difference in effect of fluid pressures in said chambers on said piston, brake controlling means operative upon a reduction in brake pipe pressure to supply fluid under pressure to said main chamber and upon an increase in pressure in said brake pipe to release fluid under pressure from said main chamber, a compensating device comprising a fulcrum member adjustable to empty and load positions and to positions therebetween, and means controlled by pressure of fluid in said main chamber cooperable with said fulcrum member to vary the pressure of fluid in said compensating chamber according to the position of said fulcrum member, adjusting means operable in accordance with the position of said sprung part with respect to said unsprung part to correspondingly adjust said fulcrum member in the direction of said load position, and means biasing said fulcrum member in the direction of said empty position against force of said adjusting means.

12. In a variable load brake equipment for a vehicle having a sprung part and an unsprung part, a brake pipe, a brake cylinder device comprising a casing and a piston therein dividing said casing into a main pressure chamber at one side of said piston and a compensating chamber at the opposite side and operative to provide braking force on said vehicle equal to the difference in effect of fluid pressures in said chambers on said piston, brake controlling means operative upon a reduction in brake pipe pressure to supply fluid under pressure to said main chamber and upon an increase in pressure in said brake pipe to release fluid under pressure from said main chamber, a compensating device comprising a fulcrum member adjustable to empty and load positions and to positions therebetween, and means controlled by pressure of fluid in said main chamber cooperable with said fulcrum member to vary the pressure of fluid in said compensating chamber according to the position of said fulcrum member, adjusting means comprising a piston operable by fluid under pressure, and means operable by said piston in accordance with the position of said sprung part with respect to said unsprung part to correspondingly adjust said fulcrum member in the direction of said load position, and means for opposing adjustment of said fulcrum member by said piston with a force less than developed by said piston for biasing said fulcrum member to its said empty position.

13. In a variable load brake equipment for a vehicle having a sprung part and an unsprung part, a brake pipe, a brake cylinder device comprising a casing and a piston therein dinvinding said casing into a main pressure chamber at one side of said piston and a compensating chamber at the opposite side and operative to provide braking force on said vehicle equal to the difference in effect of fluid pressures in said chambers on said piston, brake controlling means operative upon a reduction in brake pipe pressure to supply fluid under pressure to said main chamber and upon an increase in pressure in said brake pipe to release fluid under pressure from said main chamber, a compensating device comprising a fulcrum member adjustable to empty and load positions and to positions therebetween, and means controlled by pressure of fluid in said main chamber cooperable with said fulcrum member to vary the pressure of fluid in said compensating chamber according to the position of said fulcrum member, adjusting means comprising piston means operable by fluid under pressure, and means operable by said piston means in accordance with the position of said sprung part with respect to said unsprung part to correspondingly adjust said fulcrum member in the direction of said load position, and means for opposing adjustment of said fulcrum member by said piston means with a force less than developed by said piston means for biasing said fulcrum member toward said empty position, locking means for holding said fulcrum member in an adjusted position, actuating means for rendering said locking means effective and ineffective, means for controlling said actuating means operative upon rendering said locking means ineffective to effect a supply of fluid under pressure to actuate said piston means, means operative upon operation of said actuating means to render said locking means effective to release fluid under pressure from said piston means, and means for retarding the release of fluid under pressure from said piston means.

14. In a variable load brake equipment for a vehicle having a sprung part and an unsprung part, a brake pipe, a brake cylinder device comprising a casing and a piston therein dividing said casing into a main pressure chamber at one side of said piston from a compensating chamber at the opposite side and operative to provide braking force on said vehicle equal to the difference in effect of fluid pressures in said chambers on said piston, brake controlling means operative upon a reduction in brake pipe pressure to supply fluid under pressure to said main chamber and upon an increase in pressure in said brake pipe to release fluid under pressure from said main chamber, other valve means subject to a control pressure of fluid from said main chamber and opposing pressure of fluid in said compensating chamber operative to vary pressure of fluid in said compensating chamber in proportion to said control pressure in excess of a chosen degree of control pressure, and means determining said chosen excess of control pressure.

15. In a variable load brake equipment for a vehicle having a sprung part and an unsprung part, a brake pipe, a brake cylinder device comprising a casing and a piston therein dividing said casing into a main pressure chamber at one side of said piston from a compensating chamber at the opposite side and operative to provide braking force on said vehicle equal to the difference in effect of fluid pressures in said chambers on said piston, brake controlling means operative upon a reduction in brake pipe pressure to supply fluid under pressure to said main chamber and upon an increase in pressure in said brake pipe to release fluid under pressure from said main chamber, a relay comprising a rockable beam, an adjustable fulcrum therefor, fluid pressure control valve means controlled by said beam for controlling pressure of fluid in said compensating chamber, a first movable abutment connected to said beam subject to and operable by pressure of fluid in said main pressure chamber to actuate said beam and valve means to supply fluid under pressure to said compensating chamber, and means including a second movable abutment connected to said beam and subject to pressure of fluid in said compensating chamber acting in opposition to pressure of fluid on said first movable abutment, for actuating said beam and valve means to limit pressure of fluid in said compensating chamber to a chosen degree less than in said main chamber regardless of the position of said fulcrum with respect to said beam.

16. In a variable load brake equipment for a vehicle having a sprung part and an unsprung part, a brake pipe, a brake cylinder device comprising a casing and a piston therein dividing said casing into a main pressure chamber at one side of said piston from a compensating chamber at the opposite side and operative to provide braking force on said vehicle equal to the difference in effect of fluid pressures in said chambers on said piston, brake controlling means operative upon a reduction in brake pipe pressure to supply fluid under pressure to said main chamber and upon an increase in pressure in said brake pipe to release fluid under pressure from said main chamber, a relay comprising a rockable beam having a fulcrum, first and second movable abutments of equal areas subject, respectively and opposingly, to pressure of fluid in said main chamber and compensating chamber and connected to said beam, valve means controlled by rocking of said beam for varying pressure of fluid in said compensating chamber according to variations in pressure of fluid in said main chamber, and bias means opposing pressure of fluid on said first movable abutment with a chosen force for proportionately limiting the pressure of fluid in said compensating chamber to a degree less than in said main chamber.

17. In a variable load brake equipment for a vehicle having a sprung part and an unsprung part, a brake pipe, a brake cylinder device comprising a casing and a piston therein dividing said casing into a main pressure chamber at one side of said piston from a compensating chamber at the opposite side and operative to provide braking force on said vehicle equal to the difference in effect of fluid pressures in said chambers on said piston, brake controlling means operative upon a reduction in brake pipe pressure to supply fluid under pressure to said main chamber and upon an increase in pressure in said brake pipe to release fluid under pressure from said main chamber, a relay comprising a rockable beam having a fulcrum, first and second movable abutments of equal areas subject, respectively and opposingly, to pressure of fluid in said main and compensating chambers and connected to said beam, valve means controlled by rocking of said beam for varying pressure of fluid in said compensating chamber according to variations in pressure of fluid in said main chamber, and a spring opposing pressure of fluid on said first movable abutment with a chosen force for correspondingly limiting the pressure of fluid in said compensating chamber to a degree less than in said main chamber.

18. In a variable load brake equipment for a vehicle having a sprung part and an unsprung part, a brake pipe, a brake cylinder device comprising a casing and a piston therein dividing said casing into a main pressure chamber at one side of said piston from a compensating chamber at the opposite side and operative to provide braking force on said vehicle equal to the difference in effect of fluid pressures in said chambers on said piston, brake controlling means operative upon a reduction in brake pipe pressure to supply fluid under pressure to said main chamber and upon an increase in pressure in said brake pipe to release fluid under pressure from said main chamber, a relay comprising an equalizing member, and an adjustable fulcrum therefor and operable by fluid under pressure from said main chamber to supply fluid under pressure to said compensating chamber at a pressure proportional to the position of said fulcrum with respect to said equalizing member, means for adjusting said fulcrum relative to said equalizing member in accordance with the load on said vehicle, and pressure means acting on one end of said equalizing member urging it against said fulcrum.

19. In a variable load brake equipment for a vehicle having a sprung part and an unsprung part, a brake pipe, a brake cylinder device comprising a casing and a piston therein dividing said casing into a main pressure chamber at one side of said piston from a compensating chamber at the opposite side and operative to provide braking force on said vehicle equal to the difference in effect of fluid pressures in said chambers on said piston, brake controlling means operative upon a reduction in brake pipe pressure to supply fluid under pressure to said main chamber and upon an increase in pressure in said brake pipe to release fluid under pressure from said main chamber, a relay comprising an equalizing member, an adjustable fulcrum therefor, means for adjusting said fulcrum relative to said equalizing member in accordance with the load on said vehicle, a movable pilot abutment connected to one end of said member subject to pressure of fluid in said main chamber, a movable balancing abutment connected to the opposite end of said equalizing member subject to pressure of fluid in said compensating chamber opposing pressure of fluid on said pilot abutment, a fluid pressure supply valve operable by said adjusting abutment when pressure of fluid on said pilot abutment over-balances that on said adjusting abutment to supply fluid under pressure to said compensating chamber, a fluid pressure release valve operable by movement of said adjusting abutment when pressure thereon over-balances that on said pilot abutment to release fluid under pressure from said compensating chamber, and spring means biasing said adjusting abutment against said pilot abutment.

EARLE S. COOK.
GLENN T. McCLURE.
JOHN W. RUSH.

REFERENCES CITED

The following references are of record in the file of this patent:

UNITED STATES PATENTS

| Number | Name | Date |
| --- | --- | --- |
| 2,367,598 | Miller | Jan. 16, 1945 |
| 2,390,049 | Baldwin | Dec. 4, 1945 |